(12) United States Patent
Bond, Jr. et al.

(10) Patent No.: US 10,247,346 B2
(45) Date of Patent: Apr. 2, 2019

(54) HIGH PRESSURE PIPE AND FITTING RESTRAINT SYSTEM

(71) Applicant: GULFSTREAM SERVICES, INC., Houma, LA (US)

(72) Inventors: Robert Bond, Jr., Houma, LA (US); Michael Mire, Houma, LA (US)

(73) Assignee: Gulfstream Services, Inc., Houma, LA (US)

( * ) Notice: Subject to any disclaimer, the term of this patent is extended or adjusted under 35 U.S.C. 154(b) by 0 days.

(21) Appl. No.: 15/890,714

(22) Filed: Feb. 7, 2018

(65) Prior Publication Data

US 2018/0266611 A1  Sep. 20, 2018

Related U.S. Application Data

(63) Continuation of application No. 14/173,194, filed on Feb. 5, 2014, now Pat. No. 9,890,890.
(Continued)

(51) Int. Cl.
*F16L 55/00* (2006.01)
*F16L 13/04* (2006.01)
(Continued)

(52) U.S. Cl.
CPC .......... *F16L 55/005* (2013.01); *F16L 3/14* (2013.01); *F16L 3/26* (2013.01); *F16L 13/04* (2013.01); *F16L 35/00* (2013.01); *F16L 57/00* (2013.01)

(58) Field of Classification Search
CPC ......... F16L 55/005; F16L 35/00; F16L 13/04; F16L 3/14; F16L 3/26; F16L 57/00
(Continued)

(56) References Cited

U.S. PATENT DOCUMENTS

| 2,746,773 | A |   | 5/1956 | Bily |
| 3,197,240 | A | * | 7/1965 | Lindberg ............ F16L 55/005 24/115 R |

(Continued)

FOREIGN PATENT DOCUMENTS

| EP | 0167425 |   | 1/1986 |
| EP | 167425 A | * | 1/1986 |

(Continued)

OTHER PUBLICATIONS

Stromberg, J.L., SPE 24619, Restraining System to Help Contain Well Flowlines and Equipment During Rupture for Increased Safety, SPE Annual Technical Conference and Exhibition, Oct. 4-7, 1992, Washington, D.C.
(Continued)

*Primary Examiner* — Babajide A Demuren
(74) *Attorney, Agent, or Firm* — Garvey, Smith & Nehrbass, Patent Attorneys, L.L.C.; Charles C. Garvey, Jr.; Julie R. Chauvin

(57) ABSTRACT

A restraint system for use in securing temporary flow lines that include multiple pipe sections, each pair of pipe sections connected together with a fitting or coupling such as a hammer joint coupling. The system includes multiple pluralities of endless loop slings connected end to end with a cow hitch or girth hitch knot. Disconnectable fittings (e.g., shackles) are placed every three or more slings so that easy disassembly is afforded in case of leakage or other failure.

19 Claims, 16 Drawing Sheets

Related U.S. Application Data

(60) Provisional application No. 61/760,956, filed on Feb. 5, 2013.

(51) Int. Cl.
| | |
|---|---|
| *F16L 57/00* | (2006.01) |
| *F16L 3/26* | (2006.01) |
| *F16L 35/00* | (2006.01) |
| *F16L 3/14* | (2006.01) |

(58) Field of Classification Search
USPC .................. 285/117, 114, 81; 138/107, 108; 137/377, 343; 24/115 K, 122.6, 135 R, 24/335
See application file for complete search history.

(56) References Cited

U.S. PATENT DOCUMENTS

| | | | | |
|---|---|---|---|---|
| 3,360,838 A | * | 1/1968 | Comer | D02G 1/0266 28/154 |
| 3,859,692 A | * | 1/1975 | Waterman | F16L 55/005 24/300 |
| 4,333,675 A | * | 6/1982 | Wirkkala | B66C 1/12 24/122.6 |
| 4,484,962 A | * | 11/1984 | Dienes | H02G 15/08 156/313 |
| 4,549,332 A | * | 10/1985 | Pouliot | F16L 55/005 24/115 H |
| 4,553,635 A | * | 11/1985 | Johnson | A01M 31/02 182/187 |
| 4,890,363 A | * | 1/1990 | Cross | F16L 55/005 24/129 R |
| 5,507,533 A | * | 4/1996 | Mumma | F16L 55/005 285/114 |
| 5,689,862 A | | 11/1997 | Hayes | |
| 5,873,608 A | * | 2/1999 | Tharp | F16L 55/005 285/114 |
| 6,192,558 B1 | * | 2/2001 | Badura | F16B 45/02 24/599.1 |
| 6,298,882 B1 | | 10/2001 | Hayes et al. | |
| 6,481,457 B2 | * | 11/2002 | Hayes | F16L 55/005 137/377 |
| 6,596,015 B1 | * | 7/2003 | Pitt | A61B 17/0469 606/232 |
| 6,837,523 B2 | | 1/2005 | Surjaatmadja et al. | |
| 7,568,333 B2 | | 8/2009 | St. Germain | |
| 7,802,823 B2 | * | 9/2010 | Piantoni | F16L 55/005 285/114 |
| 8,540,295 B2 | | 9/2013 | Babinchak | |
| 8,689,534 B1 | * | 4/2014 | Chou | F16G 15/12 59/78 |
| 9,890,890 B2 | | 2/2018 | Bond, Jr. et al. | |
| 9,920,870 B2 | | 3/2018 | Bond, Jr. et al. | |
| 2002/0095165 A1 | * | 7/2002 | Chan | A61B 17/0469 606/148 |
| 2002/0163184 A1 | | 11/2002 | Blair | |
| 2003/0036345 A1 | * | 2/2003 | Conner | A22B 5/06 28/154 |
| 2010/0077718 A1 | * | 4/2010 | Wienke | A61B 17/06166 59/84 |
| 2010/0263760 A1 | * | 10/2010 | Gayaut | F16L 3/18 138/107 |
| 2011/0298231 A1 | | 12/2011 | Dohse et al. | |
| 2013/0248004 A1 | * | 9/2013 | Money | F16L 55/005 137/15.08 |
| 2013/0319565 A1 | * | 12/2013 | St. Germain, Jr. | F16L 3/04 138/106 |
| 2013/0341470 A1 | * | 12/2013 | Lee | F16L 55/005 248/68.1 |
| 2014/0145428 A1 | * | 5/2014 | Meadows | F16L 35/00 285/117 |
| 2014/0217761 A1 | | 8/2014 | Bond, Jr. et al. | |
| 2015/0176736 A1 | | 6/2015 | O'Neil | |
| 2015/0192233 A1 | | 7/2015 | Meadows et al. | |

FOREIGN PATENT DOCUMENTS

| | | | | |
|---|---|---|---|---|
| GB | 2157757 | | 10/1985 | |
| GB | 2157757 A | * | 10/1985 | .............. A61D 1/08 |
| GB | 2439550 | | 1/2008 | |
| GB | 2439550 A | * | 1/2008 | ........... F16L 55/005 |
| SU | 286410 A1 | | 11/1970 | |
| WO | 2013184521 | | 12/2013 | |
| WO | WO-2013184521 A1 | * | 12/2013 | .............. F16L 57/00 |
| WO | 2014123963 | | 8/2014 | |

OTHER PUBLICATIONS

PCT Notification of Transmittal of the International Search Report and the Written Opinion of the International Searching Authority, International App. No. PCT/US2014/014808, dated Jun. 19, 2014.

\* cited by examiner

HIGH PRESSURE PIPE AND FITTING RESTRAINT SYSTEM

CROSS-REFERENCE TO RELATED APPLICATIONS

This application is a continuation of U.S. patent application Ser. No. 14/173,194, filed 5 Feb. 2014 (issued as U.S. Pat. No. 9,890,890 on 13 Feb. 2018), which claims the benefit of U.S. Provisional Patent Application Ser. No. 61/760,956, filed 5 Feb. 2013, each of which is hereby incorporated herein by reference.

Priority of U.S. Provisional Patent Application Ser. No. 61/760,956, filed 5 Feb. 2013, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for restraining high pressure pipeline or flow lines. More particularly, the present invention relates to a method and apparatus for restraining high pressure pipe and fittings wherein a series of endless loop slings are joined end to end with hitch type connections (such as a cow hitch, sling hitch, lanyard hitch or other like knot) and wherein each of first and second lengths of assembled slings are connected end to end with disconnectable connections (e.g., shackles) that enable service or maintenance of a selected section of the high pressure piping system without disassembly of all of the endless loop slings, and wherein the assembly of slings and connectors is knotted to the pipeline (e.g., with half hitch knots) at selected intervals.

2. General Background of the Invention

In the offshore oil and gas industry, temporary high pressure pipelines are often employed at or near a drilling platform or drilling rig or upon a deck of a drilling platform or drilling rig. These high pressure pipelines are assembled using couplings which are also high pressure rated. If one of these sections of pipe or coupling that make up the high pressure flow line fail or leak, the pipe can violently move, potentially causing injury or death to personnel and/or damage to equipment.

Patents have issued for restraint systems designed to restrain a flow line or parts thereof. The following are examples of such patents:

U.S. Pat. Nos. 2,746,773; 5,689,862; 6,481,457 (each patent is hereby incorporated herein by reference).

The '457 patent is directed to a "Safety Restraint Assembly for High Pressure Flow Line". The patent is owned by S.P.M. Flow Controls, Inc. of Fort Worth, Tex. (hereinafter "S.P.M.").

A Society of Petroleum Engineers publication which is identified by the numeral SPE 24619 and entitled "Restraining System to Help Contain Well Flow Lines and Equipment During Rupture for Increased Safety" was said to have been prepared for presentation at the 87th Annual Technical Conferences and Exhibition of the Society of Petroleum Engineers held in Washington, D.C., Oct. 4-7, 1992.

BRIEF SUMMARY OF THE INVENTION

The present invention provides a restraint system for use in securing temporary flow lines that include multiple pipe sections, each pair of sections connected together with a fitting such as a pressure holding coupling (e.g., a hammer union or coupling).

The present invention thus provides a restraint system for use in securing temporary flowlines that include multiple pipe sections, each pair of pipe sections connected together with fittings. The system includes an assembly of loop slings (preferably endless loop slings) connected end-to-end, each sling having end portions that are secured to one or more other endless slings.

Disconnectable fittings join one assembly of multiple slings to another assembly of multiple slings.

The disconnectable fitting is not a part of a sling.

In one embodiment, the disconnectable fitting can be a shackle.

In one embodiment, each endless sling is wrapped around the piping system at least one 360° wrap.

In one embodiment, there are at least three endless loop slings in each assembly.

In one embodiment, each endless loop sling assembly encircles a pipe section next to a fitting.

The present invention provides a method for restraining a temporary flow line that includes multiple pipe sections, each pair of sections connected together with a disconnectable coupling.

The method provides first and second pluralities of connected endless sling loops, each plurality including at least three endless loop slings connected end to end with a cow hitch, girth hitch or sling hitch or other hitch knot.

The endless loop slings are connected end to end and connecting each plurality to another plurality with a disconnectable connector.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part.

The present invention provides a restraint system for use in securing temporary flowlines that include multiple pipe sections, each pair of sections connected together with fittings. An assembly of endless loop slings are connected end-to-end, each sling having end portions that are secured to one or more other endless slings.

Disconnectable fittings join one assembly of multiple endless slings to another assembly of multiple endless slings;

The disconnectable fitting is not a part of an endless loop sling.

The assembly of flowlines is connected at intervals to the pipe sections and fittings using knotted connectors.

In one embodiment, the disconnectable fitting is a shackle.

In one embodiment, each endless sling is tied to the piping system with half hitch knots.

In one embodiment, there are between 2 and 12 endless loop slings in each assembly.

In one embodiment, each endless loop sling assembly is tied to a pipe section next to a fitting.

The present invention provides a method for restraining a temporary flow line that includes multiple pipe sections, each pair of sections connected together with a disconnectable coupling, the system providing first and second pluralities of connected endless sling loops.

Each plurality includes at least three endless loop slings connected end to end with a knotted connection.

The slings are connected end to end connecting each plurality to another plurality with a disconnectable connector.

The slings are knotted to the flow line at intervals using half hitch or other knotted connections.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part. In one embodiment the two parts are a shackle bow and a shackle pin.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
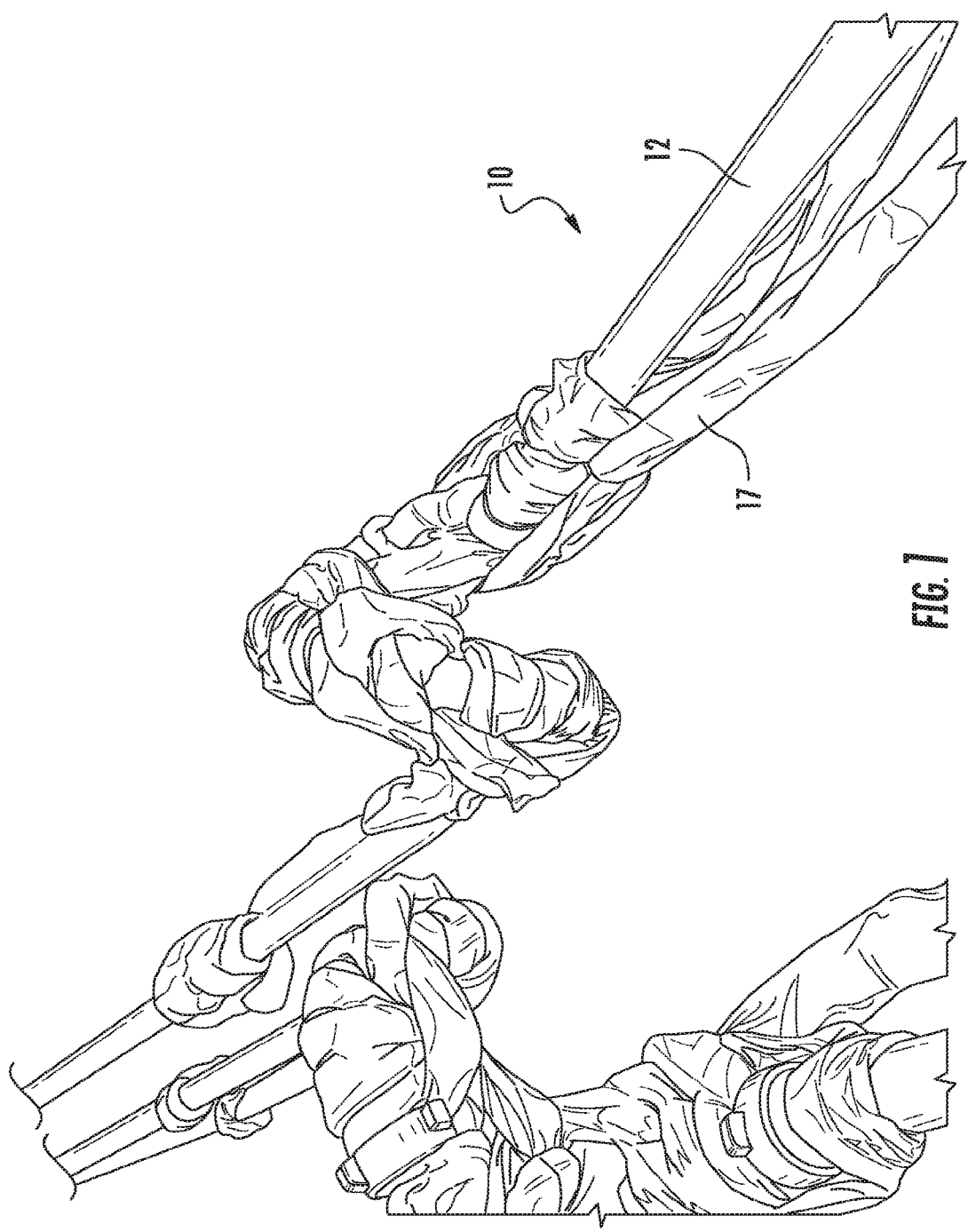
FIGS. 1-15 are views of a preferred embodiment of the apparatus of the present invention.
Figure 2:
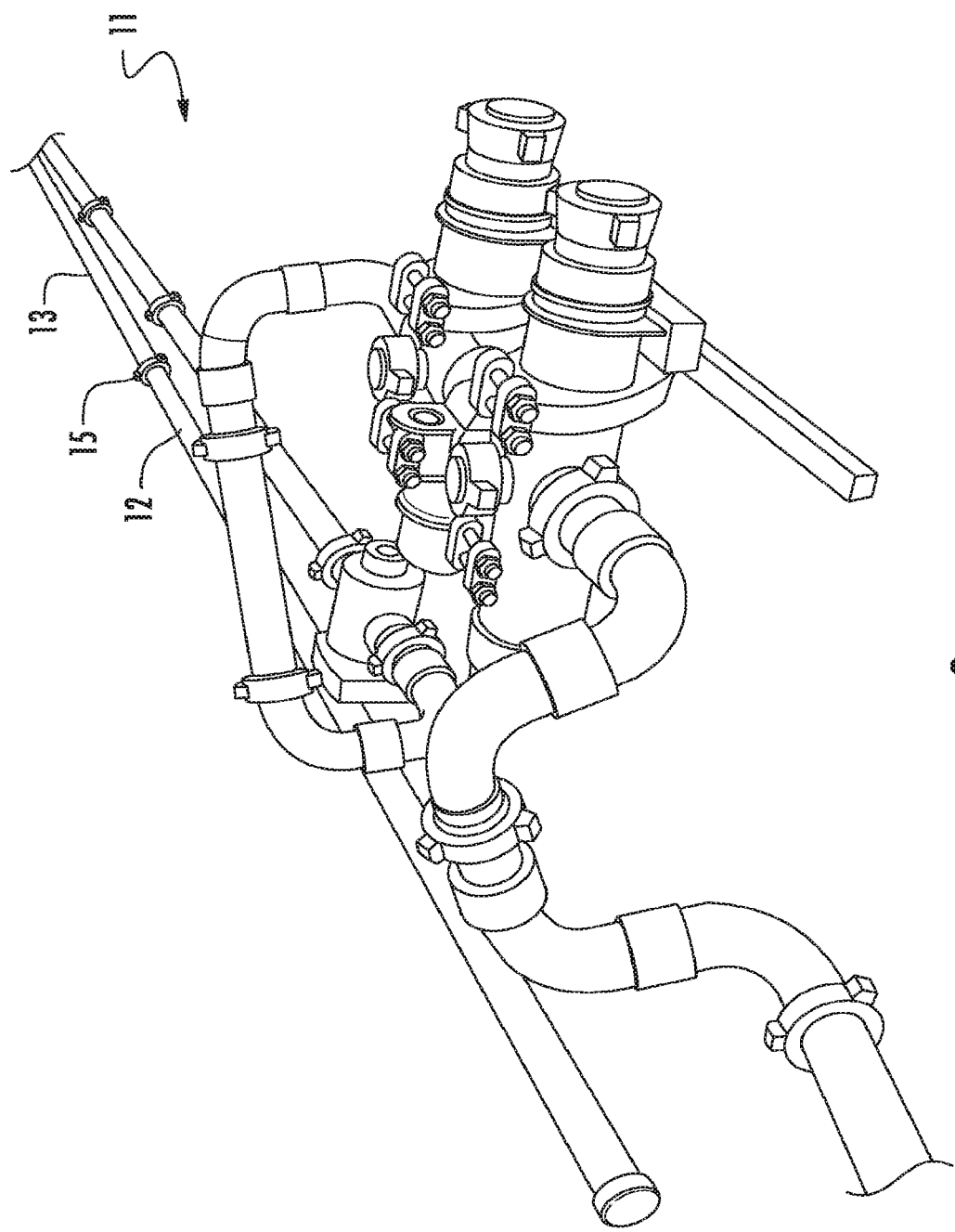
Figure 3:
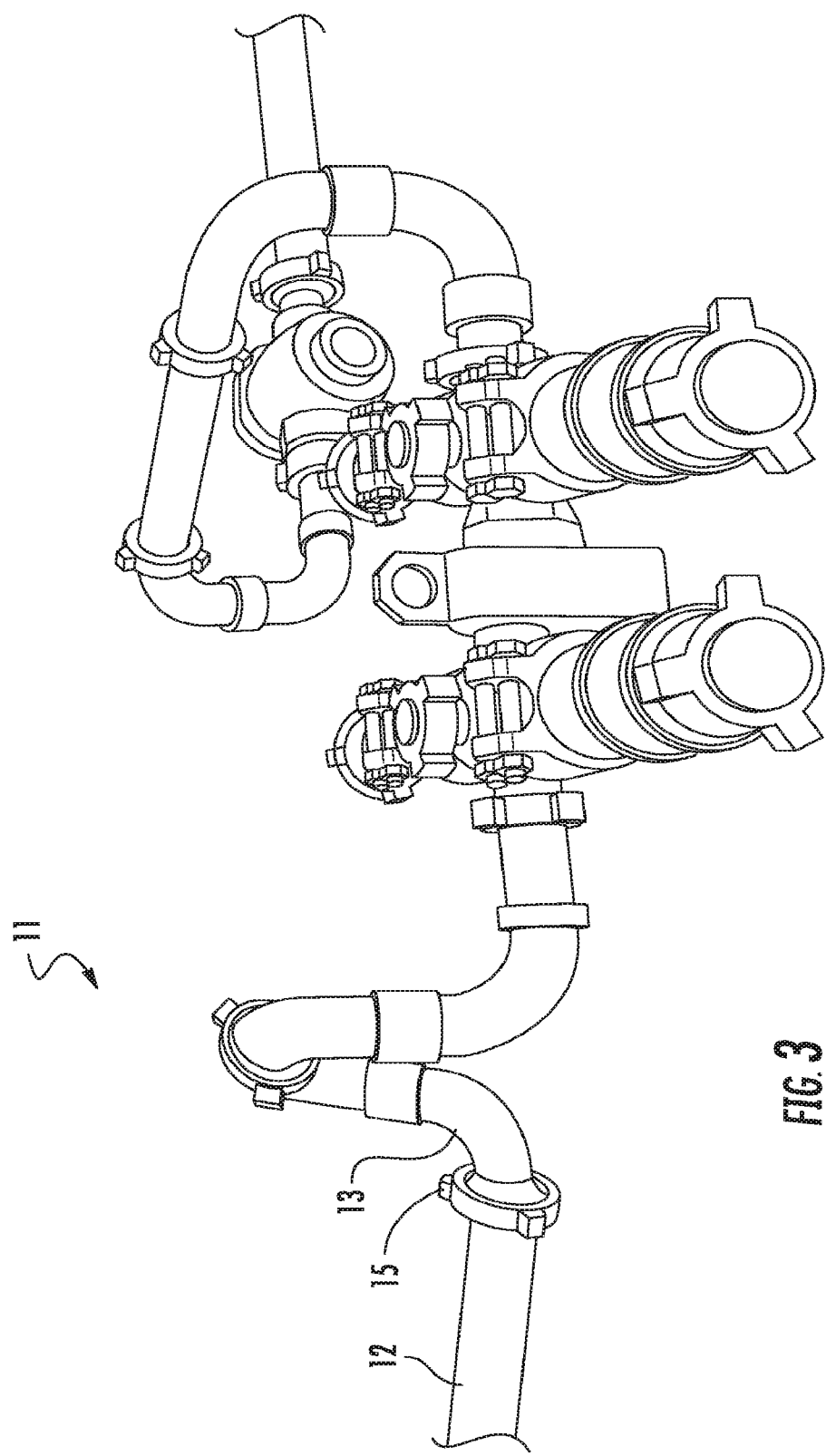
Figure 4:
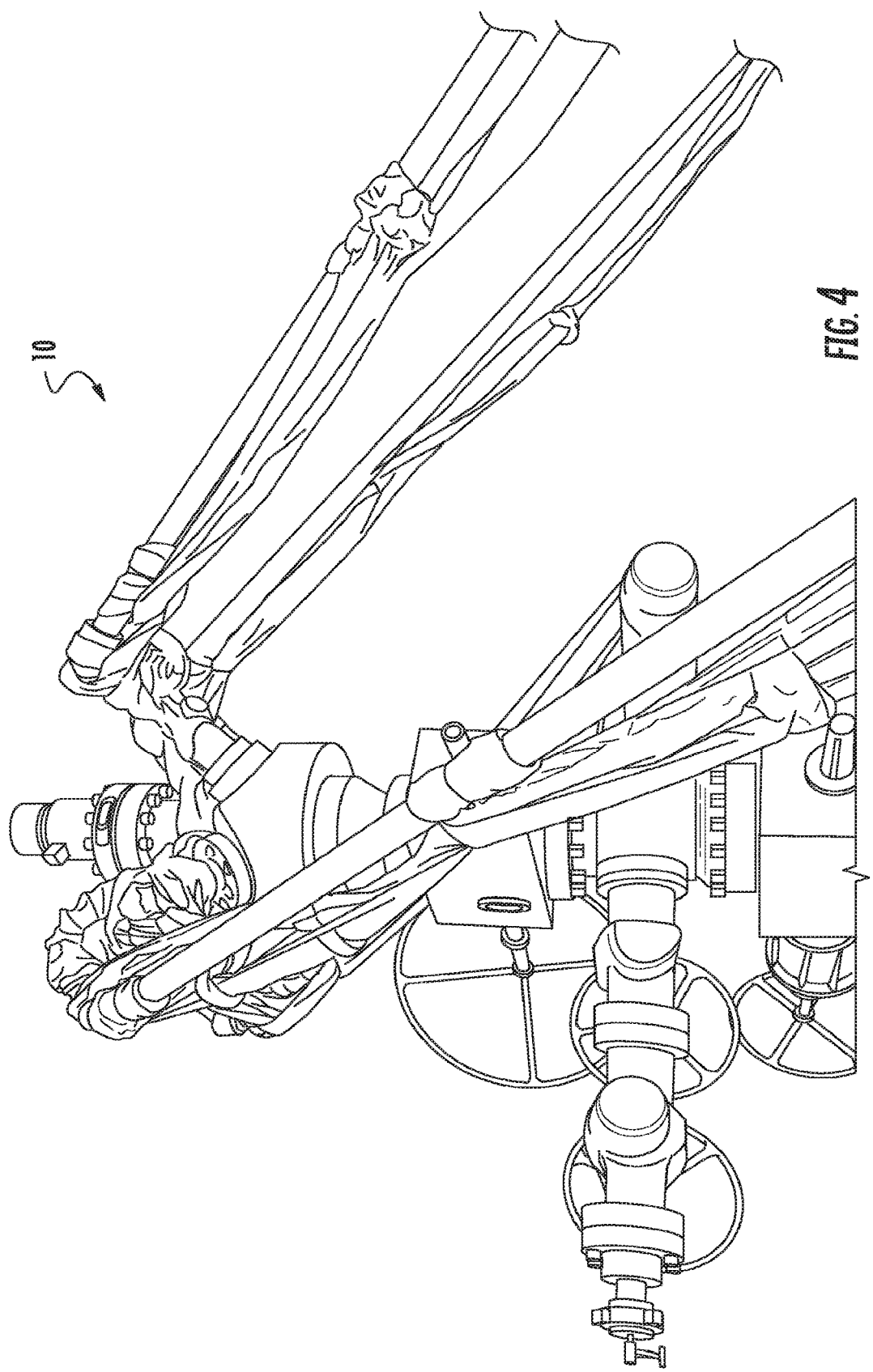
Figure 5:
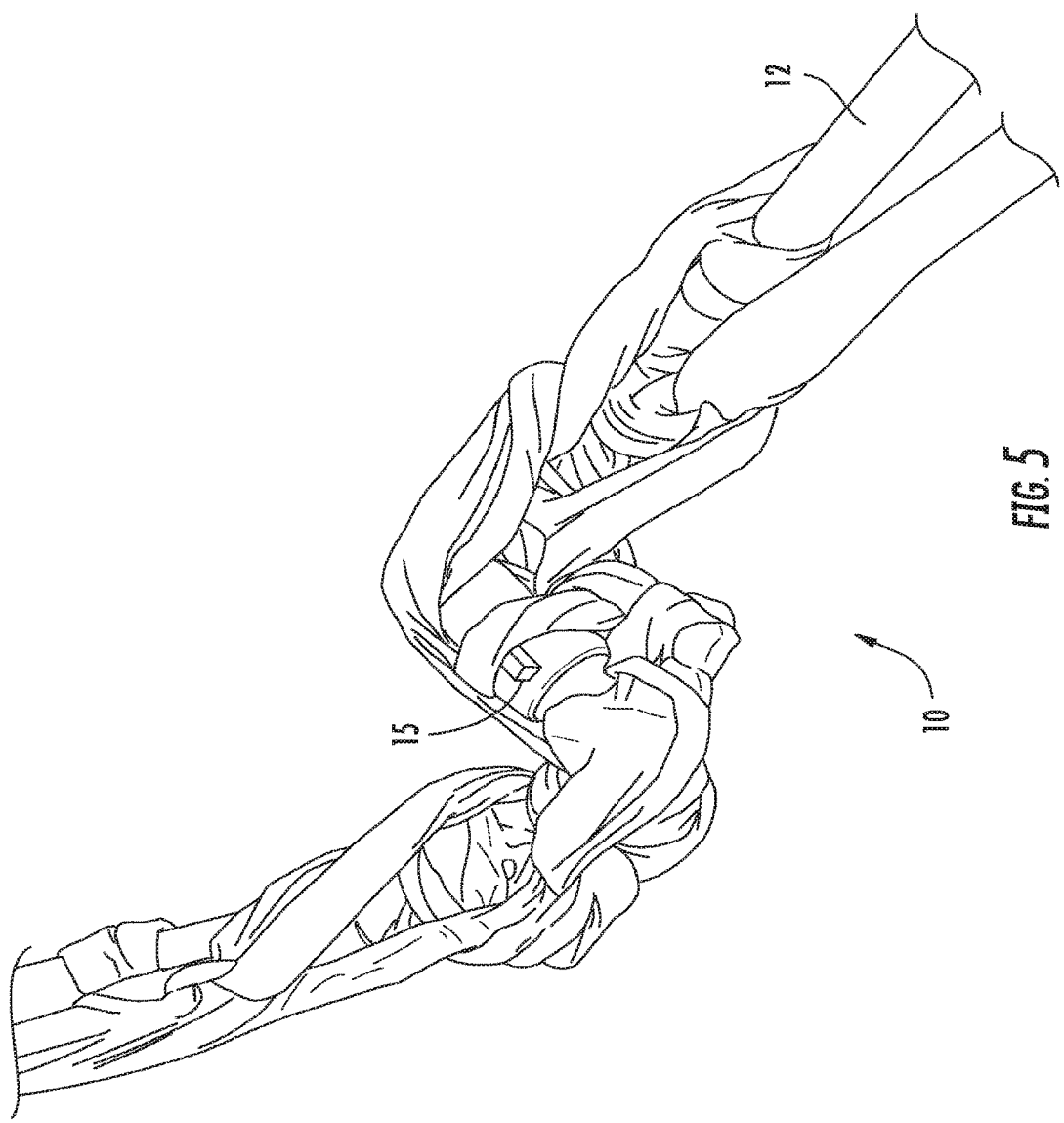
Figure 6:
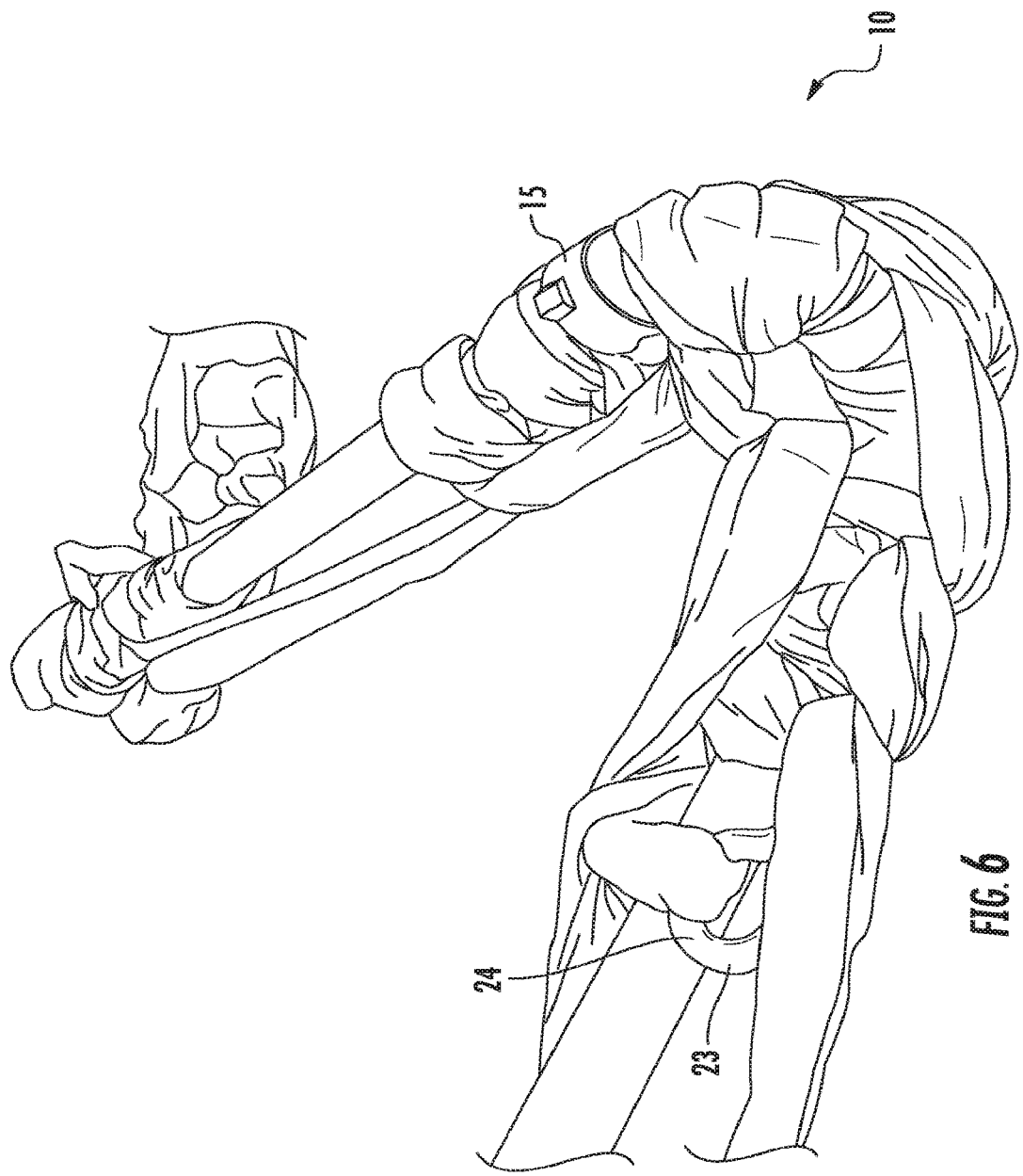
Figure 7:
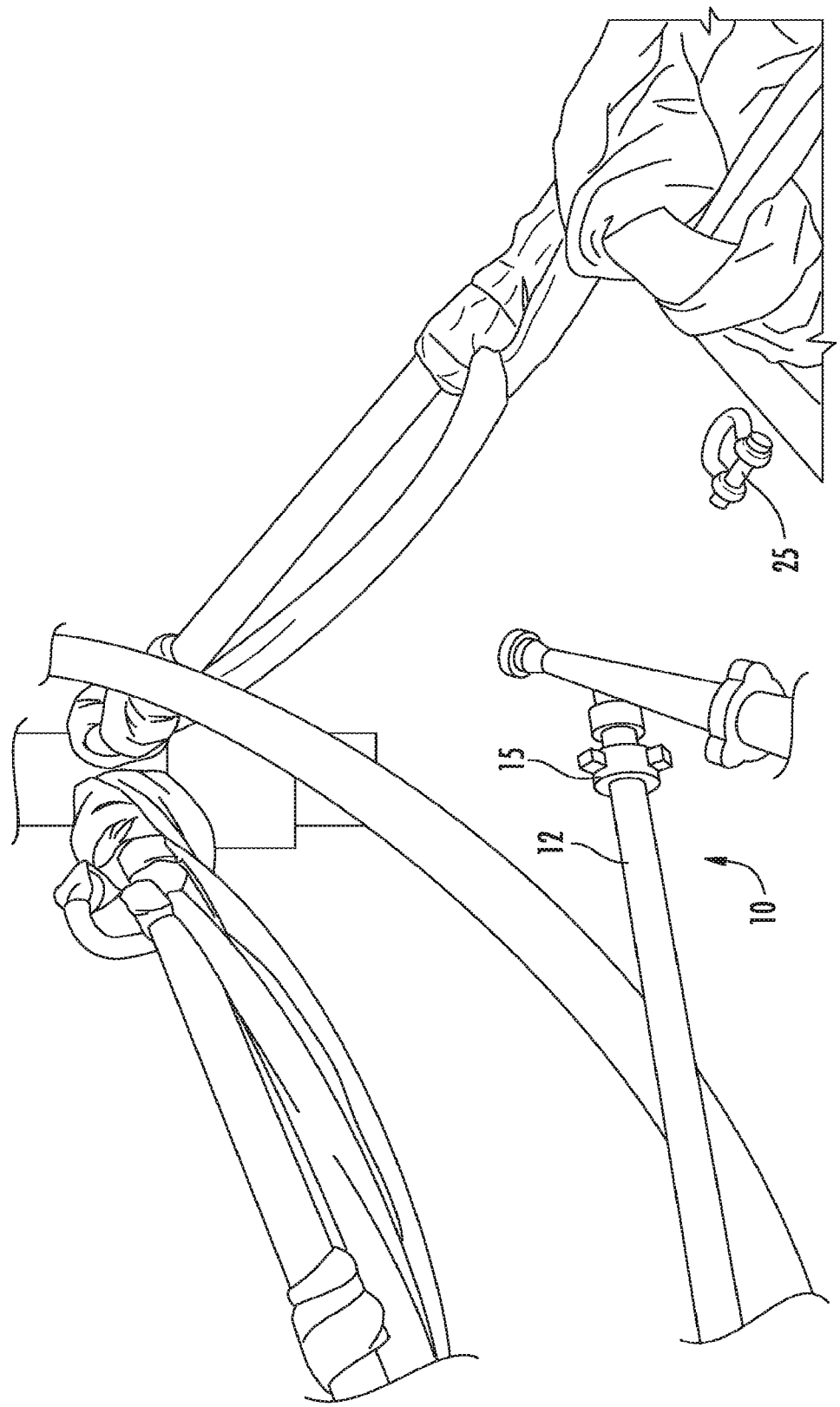
Figure 8:
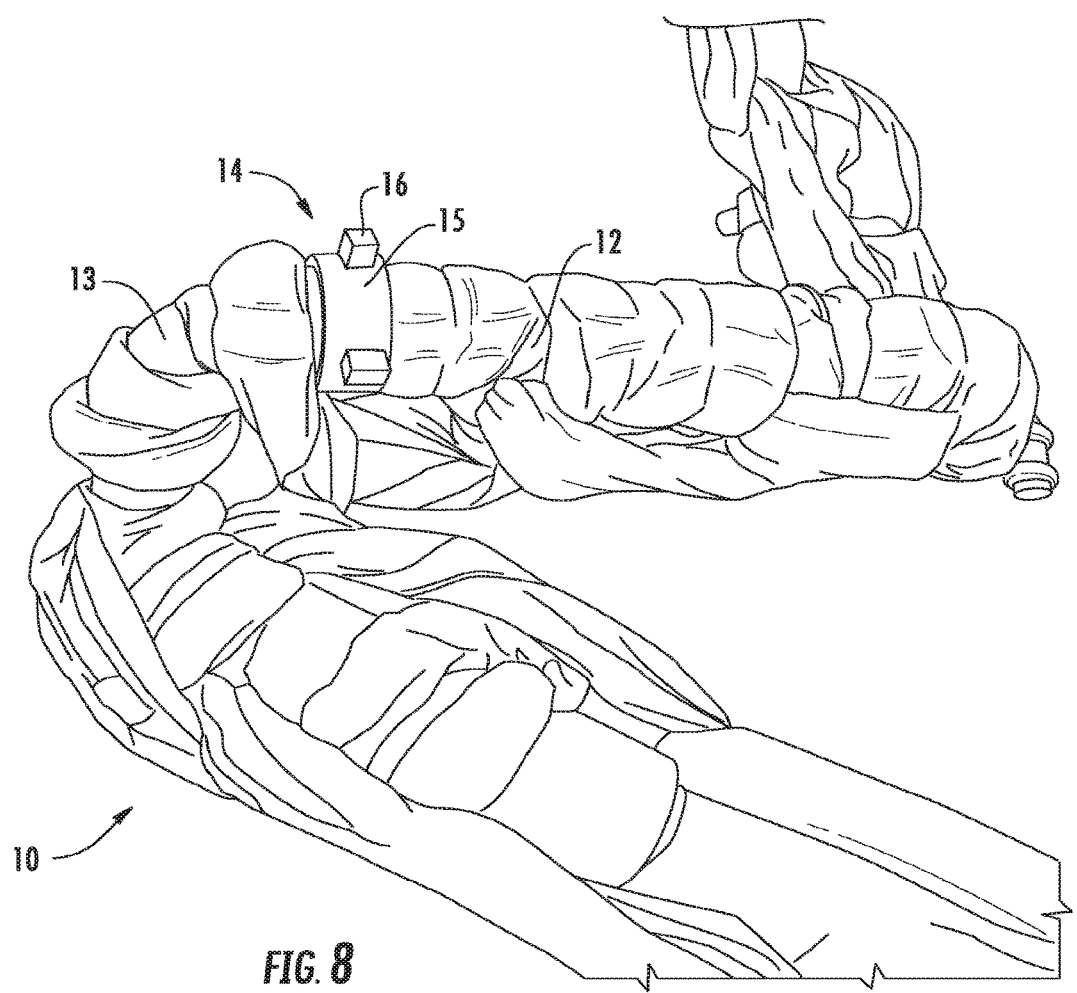
Figure 9:
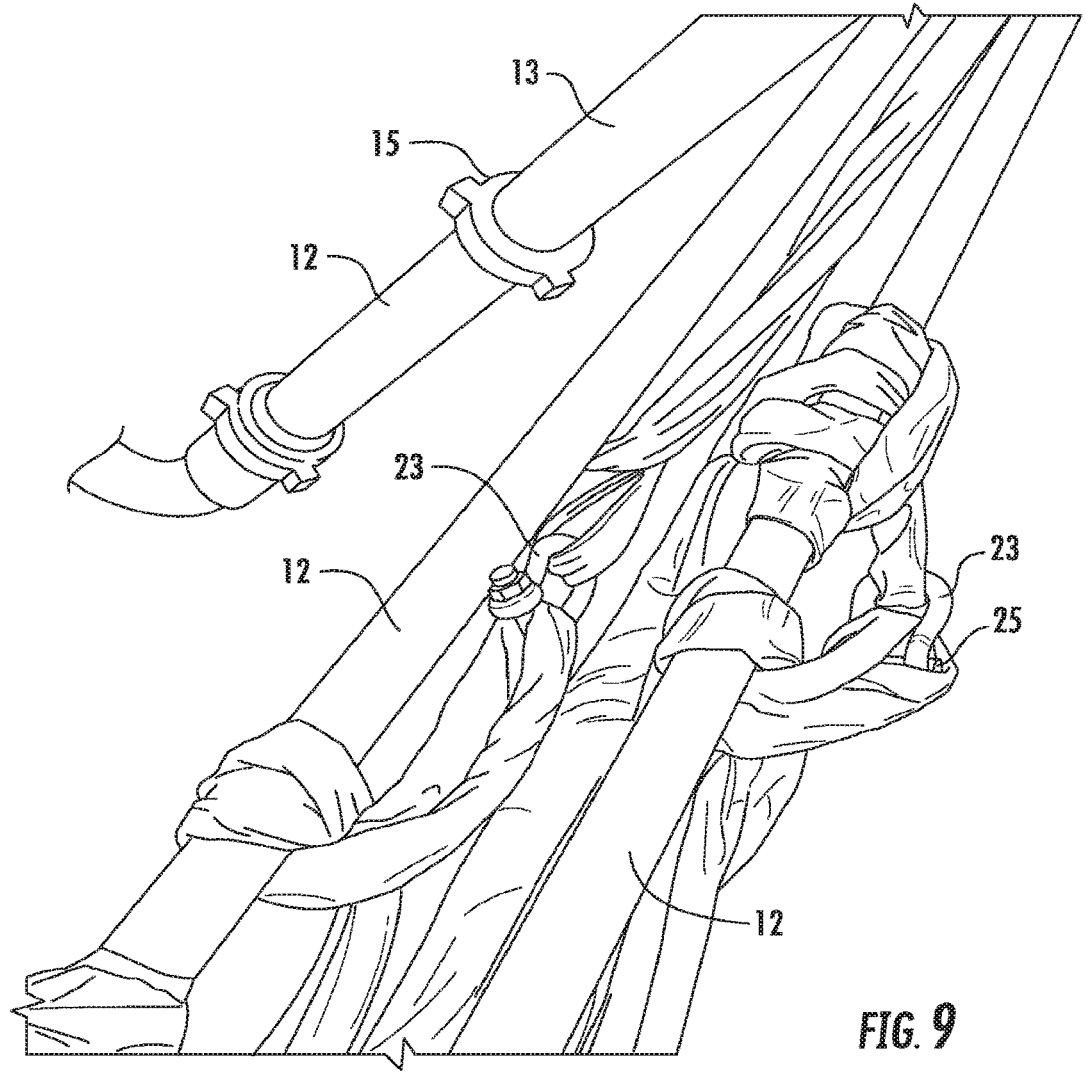
Figure 10:
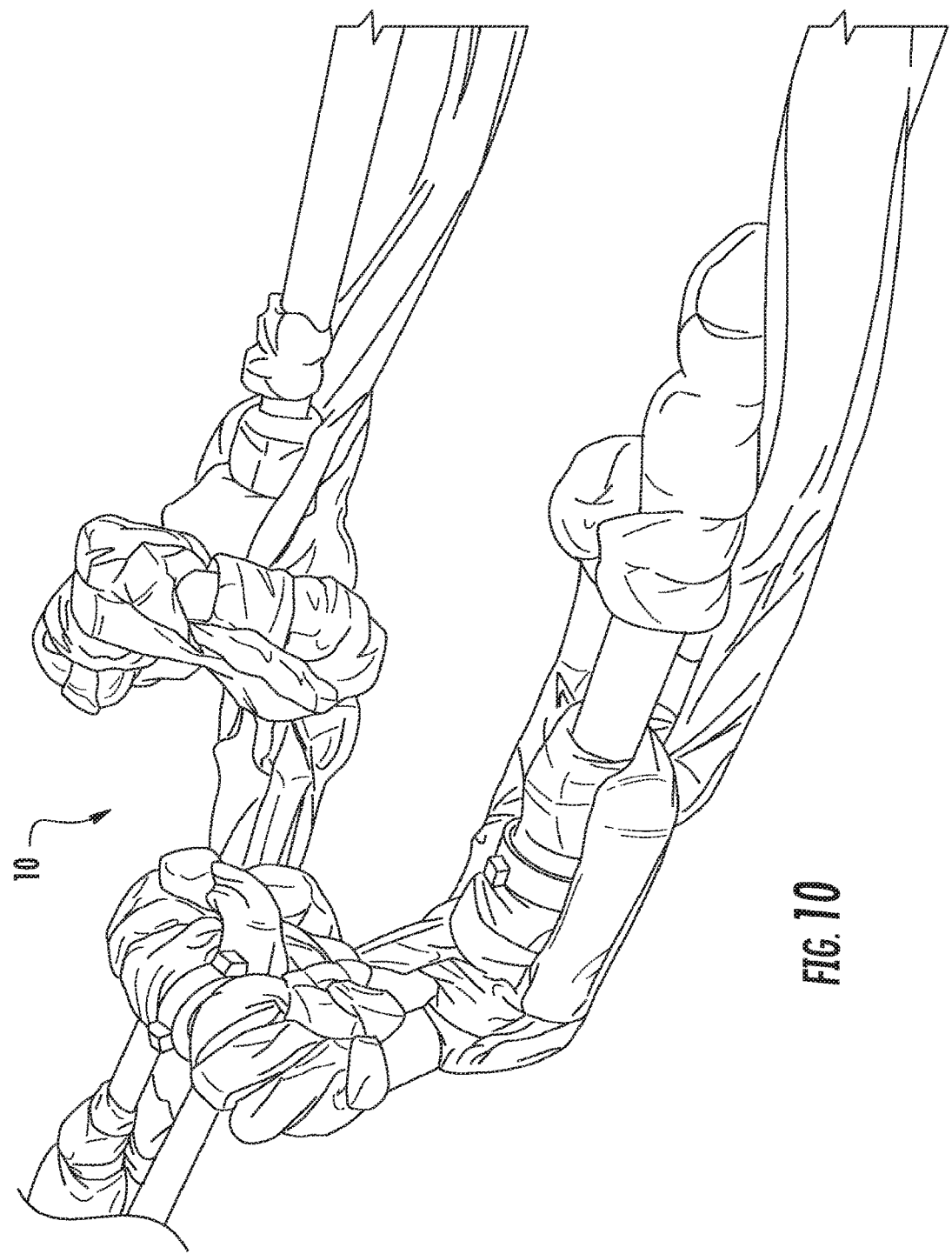
Figure 11:
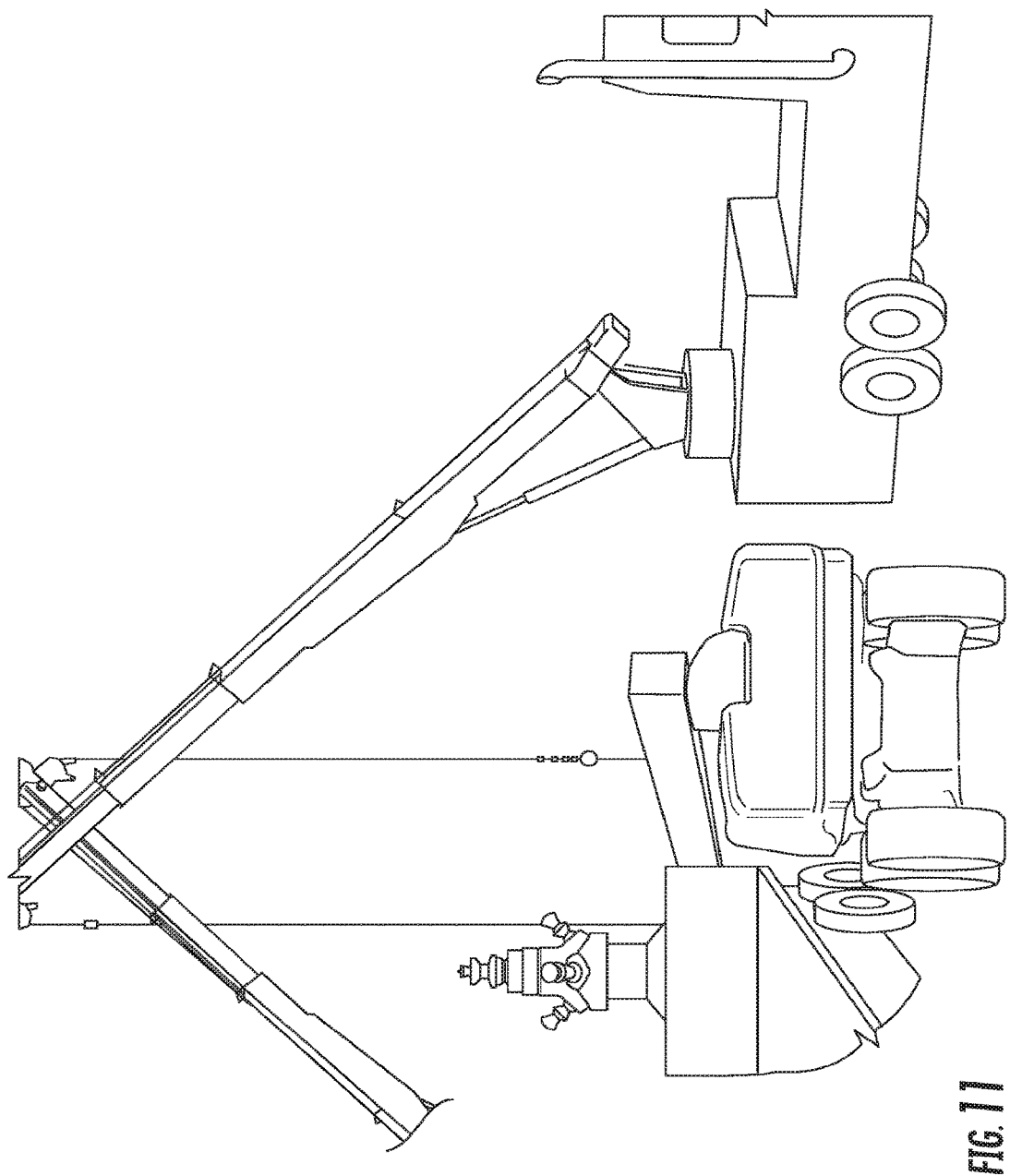
Figure 12:
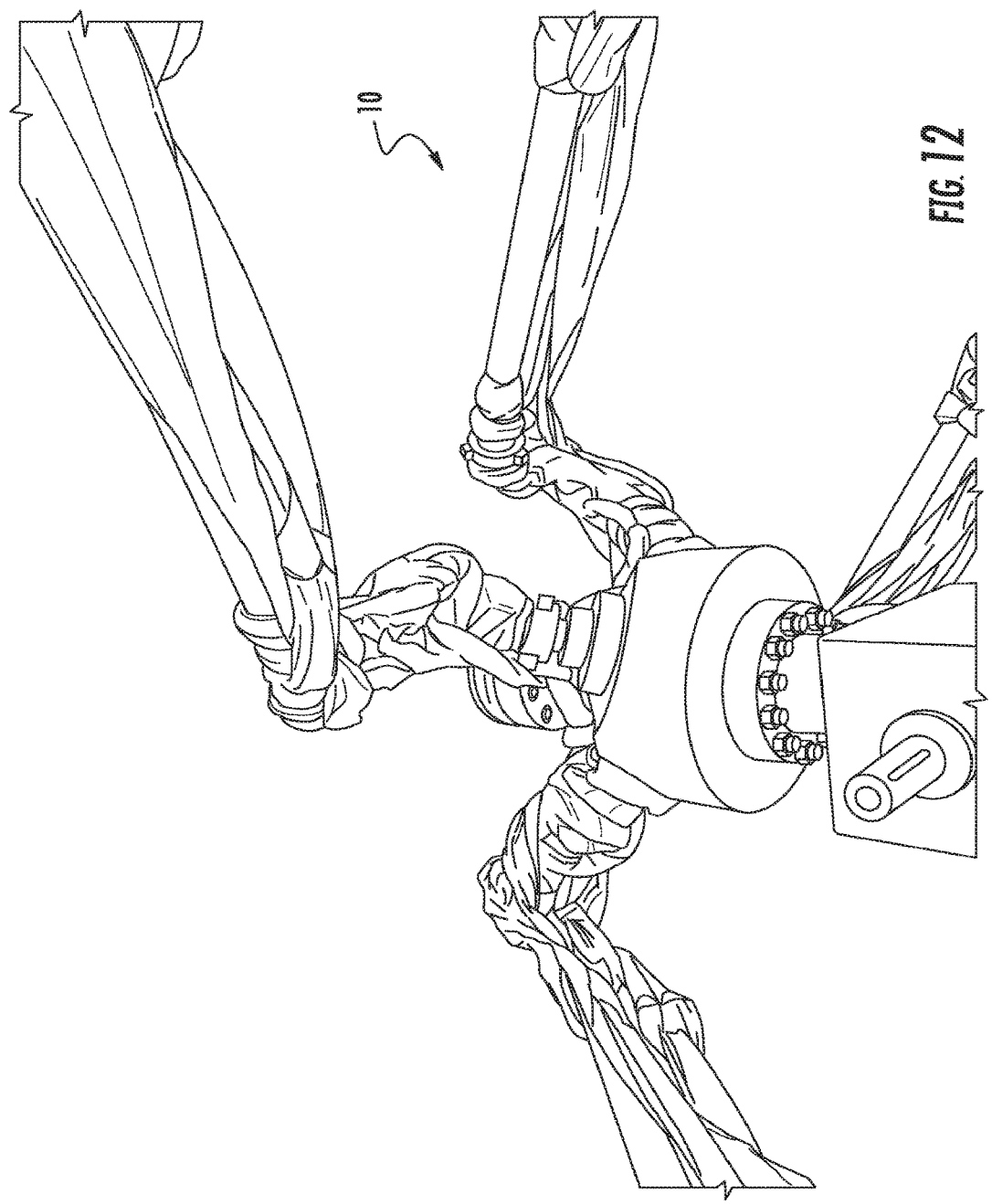
Figure 13:
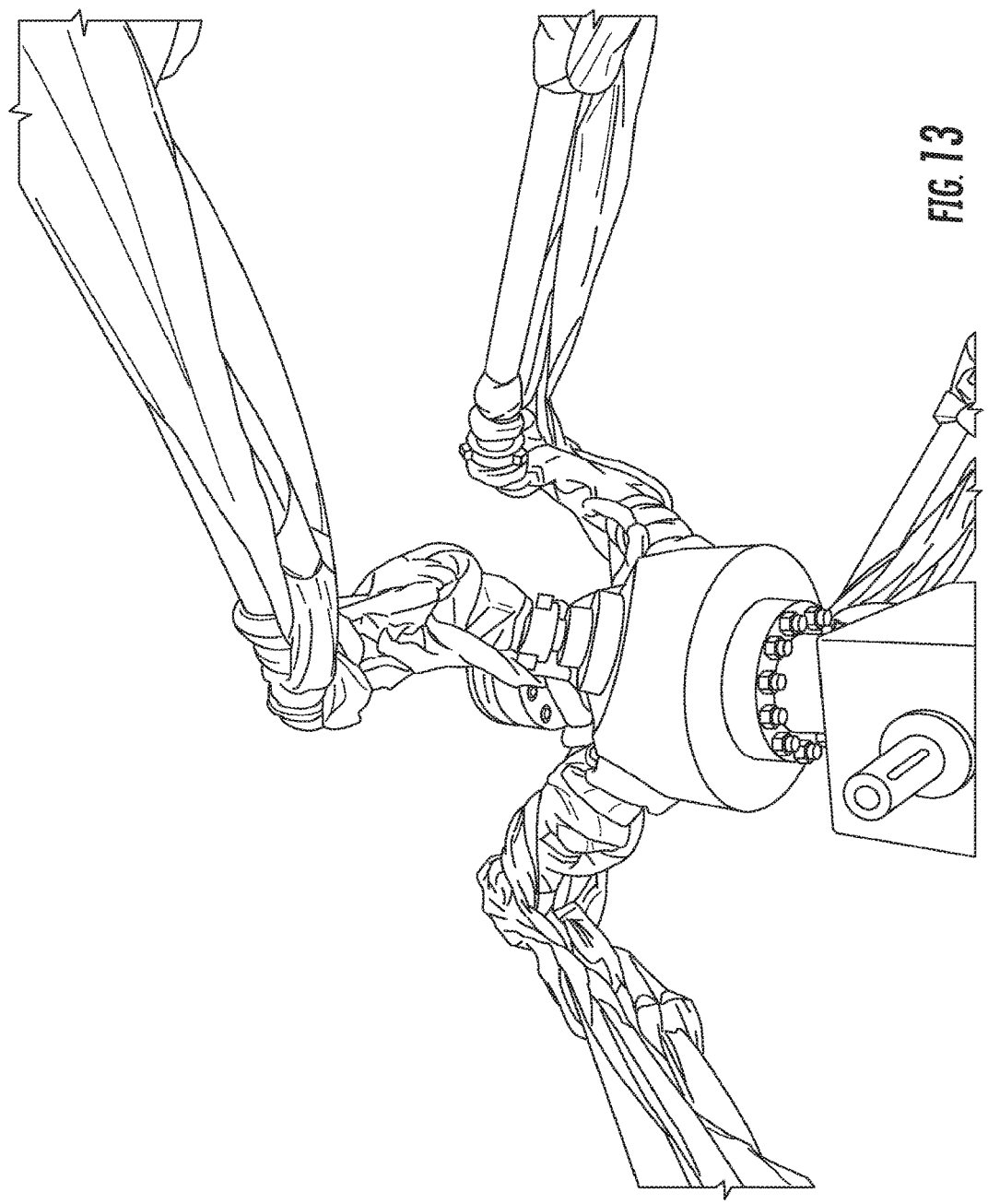
Figure 14:
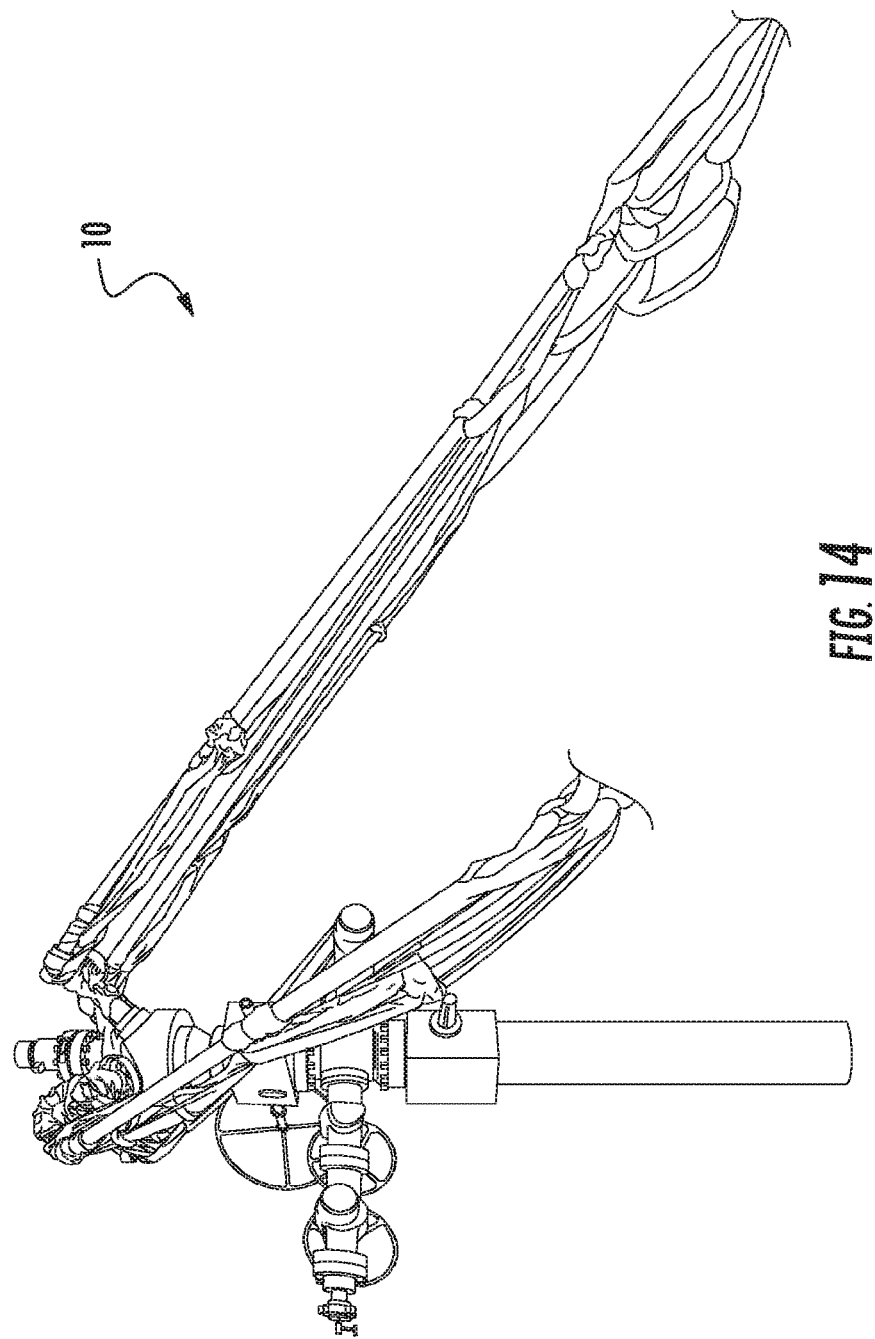
Figure 15:
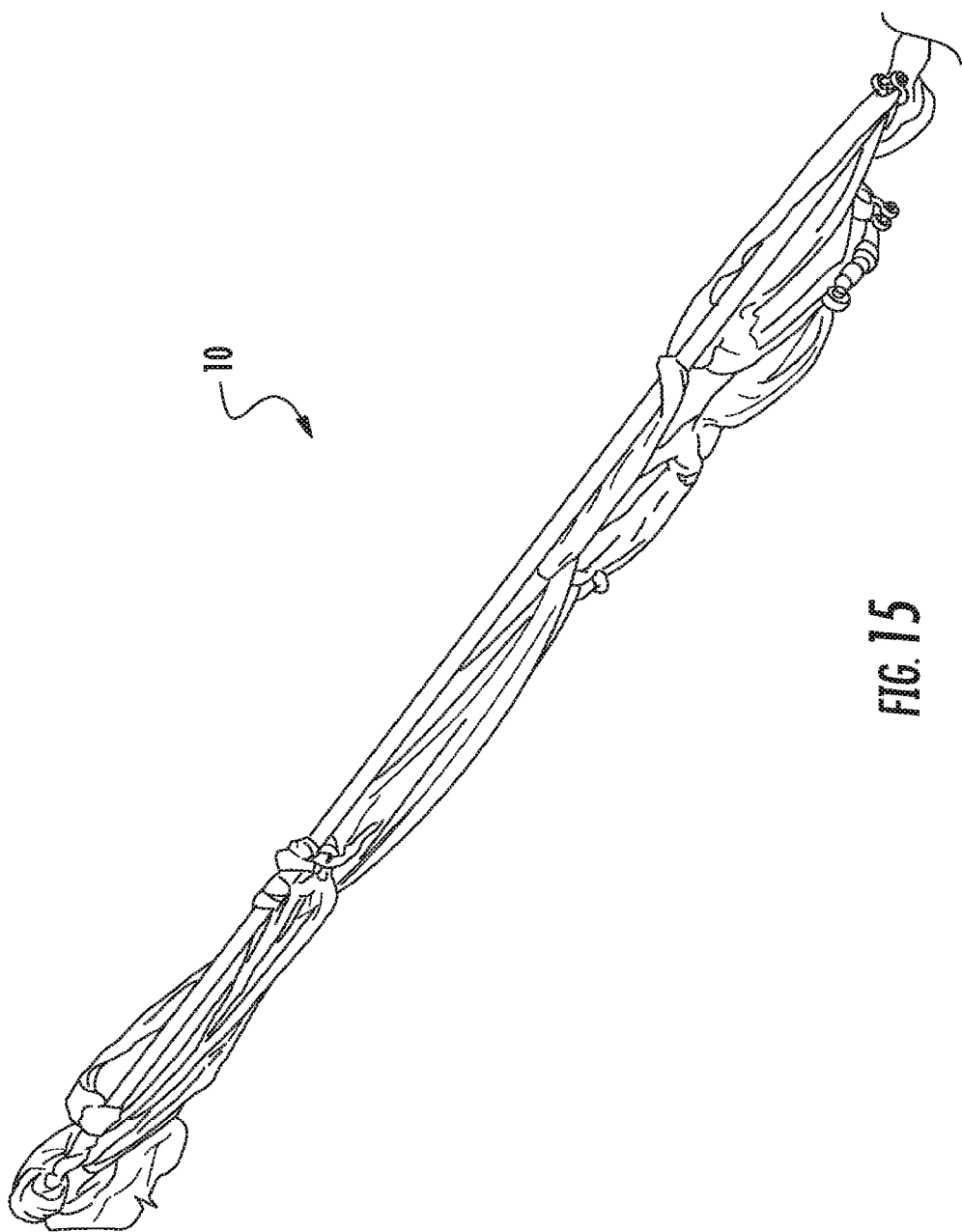

FIGS. 1-17 show a preferred embodiment of the apparatus of the present invention designated generally by the numeral 10 in FIGS. 1-15. Restraint system 10 is used to secure a high pressure flow line 11 that can be comprised of a plurality of pipe sections 12, 13 and fittings 14 (e.g., couplings, valves, elbows, tees or other fittings).

Two (2) pipe sections 12, 13 are usually connected at fitting 14. However, the term "fitting" as used herein should be construed broadly to include anything that can be part of piping system or flowline. Fitting includes but is not limited an elbow, tee, reducer, valve, coupling, union, as examples. In such a high pressure flow line 11, multiple pipe sections are typically connected end to end with unions or couplings. The flow line 11 can include straight sections of pipe, elbow or bend sections, tee fittings and the like.

A fitting 14 (e.g., a coupling such as a hammer union 14, which is commercially available) can be used to join a pair of pipe sections 12, 13 together. Such hammer unions, couplings or like fittings 14 are known in the art. Coupling 14 can provide a hammer nut 15 having projections 16 which can be pounded with a hammer to insure a tight seal for the connection of coupling or fitting 14 when it is used to join two pipe sections 12, 13 together. An example of a hammer union and seal arrangement can be seen in U.S. Pat. No. 6,764,109 entitled "Hammer Union and Seal Therefor". U.S. Pat. No. 6,764,109 is hereby incorporated herein by reference.

Figure 16:
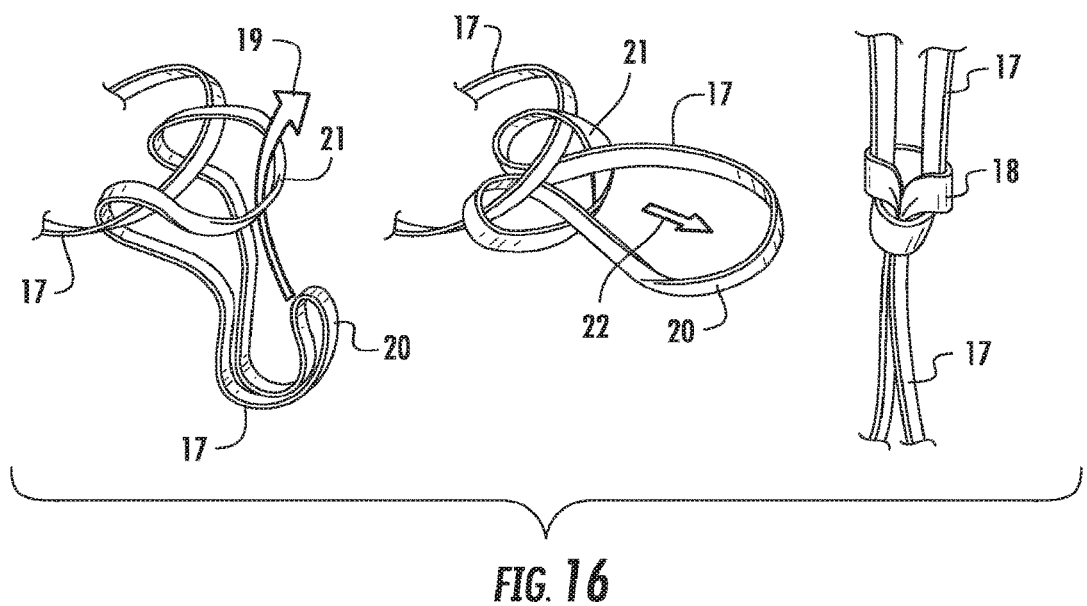
FIGS. 16-17 are fragmentary perspective views that show a cow hitch, sling hitch or girth hitch connection of one endless loop sling to another endless loop sling.
Figure 17:
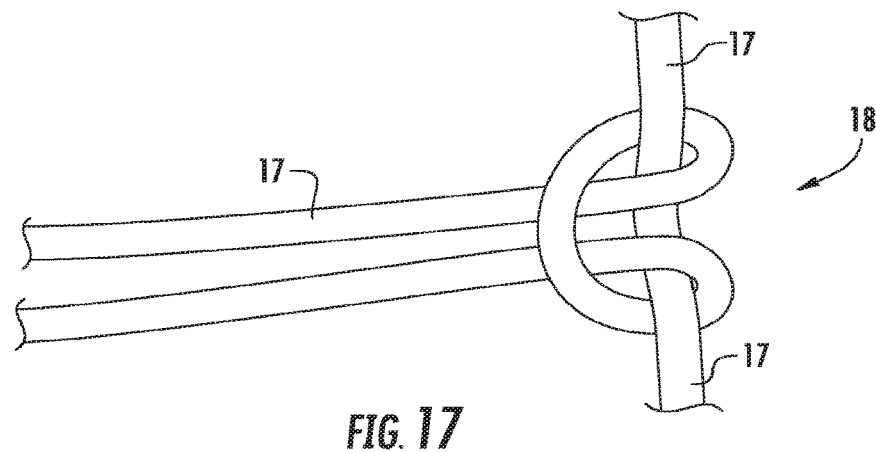

In FIGS. 16-17, there can be seen a knotted connection, such as a cow hitch or girth hitch knot 18 that joins one endless loop sling to another endless loop sling. The slings 17 are connected end to end. Every few slings, the connection is with a shackle 23 or other disconnectable connector. The knot 18 of FIGS. 16-17 can be perfected by forming a first loop 20 and passing it through a second loop 21 as indicated by arrow 19 and pulling the first loop 20 through the second loop 21 as indicated by arrow 22. The assembled slings 17 connected with knot 18 can be seen in FIGS. 16-17.

Once two or more slings 17 are connected end to end as seen in FIG. 16, an assembly of such slings 17 (e.g., three slings connected end-to-end) is connected to another assembly of slings (e.g., three slings connected end-to-end) with a disconnectable connector such as a shackle 23. Shackle 23 has two separable parts, bow 24 and pin 25. Such shackles are commercially available. In this fashion, if a leak is detected, only two shackles 23 on opposing sides of the leak need be disconnected as opposed to all of the slings 17.

The assemblies of slings 17 are knotted to the pipe and fittings at selected intervals using half hitch or other knots.

The following is a list of parts and materials suitable for use in the present invention:

PARTS LIST

| PART NUMBER | DESCRIPTION |
| --- | --- |
| 10 | restraint system |
| 11 | high pressure flow line |
| 12 | pipe section |
| 13 | pipe section |
| 14 | coupling/hammer union/fitting |
| 15 | hammer nut |
| 16 | projection |
| 17 | endless loop sling |
| 18 | cow hitch/knot girth hitch knot/sling hitch knot/knotted connection |
| 19 | arrow |
| 20 | first loop |
| 21 | second loop |
| 22 | arrow |
| 23 | shackle/disconnectable connector |
| 24 | bow |
| 25 | pin |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A restraint system for use in securing temporary flowlines that each include multiple pipe sections, each pair of sections connected together with fittings, the system comprising:
    a) multiple assemblies of endless loop slings connected end-to-end, each sling of each said assembly having a pair of sling end portions that are secured to a sling end of one or more other endless slings;
    b) disconnectable fittings that join one assembly of multiple endless slings to another assembly of multiple endless slings;
    c) wherein each disconnectable fitting is a structural metallic coupler;

d) each assembly of endless loop slings connecting at multiple spaced apart knots to the flowline, each knot encircling the flowline three hundred sixty degrees (360°);
e) wherein each said knot is positioned in between a pair of said sling end portions; and
f) wherein each said knot is formed by a said sling that is connected end-to-end with at least one other said sling of a said assembly.

2. The restraint system of claim 1 wherein one or more of the disconnectable fittings are shackles.

3. The restraint system of claim 1 where there are at least three endless loop slings in each assembly.

4. The restraint system of claim 1 wherein each endless loop sling assembly encircles a pipe section next to a fitting.

5. A method for restraining a temporary flow line that includes multiple pipe sections, each pair of sections connected together with a disconnectable coupling, comprising the steps of:
a) providing first and second pluralities of connected endless sling loops;
b) each plurality including at least three endless loop slings connected end to end with a girth hitch knot; and
c) endless loop slings connected end to end connecting each plurality to another plurality with a disconnectable connector.

6. The method of claim 5 wherein the disconnected connector is not a part of an endless sling.

7. The method of claim 5 wherein the connector is metallic.

8. The method of claim 5 wherein the connector is a shackle.

9. The method of claim 5 wherein the connector is a fitting having two parts, one part that disconnects from the other part.

10. A restraint system for use in securing temporary flowlines that each include multiple pipe sections, each pair of sections connected together with fittings, the system comprising:
a) a first assembly of endless loop slings connected end-to-end, each sling of said assembly having sling end portions that are each secured to one or more other endless loop slings;
b) a disconnectable fitting that joins one assembly of multiple endless slings to another assembly of multiple endless slings;

c) wherein the disconnectable fitting includes a metallic coupler;
d) attaching the assembly to the flowlines at intervals using knotted connectors;
e) wherein in step "d" each knotted connector is positioned in between a pair of said sling end portions; and
f) wherein each said knotted connector is formed by a said sling that is connected end-to-end with at least one other said sling of a said assembly.

11. The restraint system of claim 10 wherein the disconnectable fitting is a shackle.

12. The restraint system of claim 10 wherein each endless sling is tied to the piping system with half hitch knots.

13. The restraint system of claim 10 where there are between 2 and 12 endless loop slings in each assembly.

14. The restraint system of claim 10 wherein each endless loop sling assembly is tied to a pipe section next to a fitting.

15. A method for restraining a temporary flow line that includes multiple pipe sections, each pair of sections connected together with a disconnectable coupling, comprising the steps of:
a) providing first and second pluralities of connected endless sling loops;
b) each plurality including at least three endless loop slings connected end to end with girth hitch knots;
c) a first plurality of endless loop slings connected to a second plurality of endless loop slings with a connector that is not a single endless loop sling;
d) knotting the slings to the flow line at intervals with knots that encircle the flow line three hundred sixty degrees (360°);
e) wherein in step "d" each said knot is positioned in between a pair of said sling ends; and
f) wherein each said knot is formed by a said sling that is connected end-to-end with at least one other said sling of a said assembly.

16. The method of claim 15 wherein the connector is a fitting that is not a sling.

17. The method of claim 15 wherein the connector is metallic.

18. The method of claim 15 wherein the connector is a shackle.

19. The method of claim 15 wherein the connector is a fitting having two parts, one part that disconnects from the other part.

* * * * *